(12) United States Patent
Lev-Ran

(10) Patent No.: US 10,762,193 B2
(45) Date of Patent: Sep. 1, 2020

(54) DYNAMICALLY GENERATING AND INJECTING TRUSTED ROOT CERTIFICATES

(71) Applicant: International Business Machines Corporation, Armonk, NY (US)

(72) Inventor: Etai Lev-Ran, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 15/974,708

(22) Filed: May 9, 2018

(65) Prior Publication Data

US 2019/0347406 A1 Nov. 14, 2019

(51) Int. Cl.
| | |
|---|---|
| *G06F 21/51* | (2013.01) |
| *H04L 9/32* | (2006.01) |
| *H04L 29/06* | (2006.01) |
| *G06F 21/44* | (2013.01) |
| *H04L 9/08* | (2006.01) |
| *G06F 21/10* | (2013.01) |
| *H04L 9/00* | (2006.01) |

(52) U.S. Cl.
CPC ............ *G06F 21/51* (2013.01); *G06F 21/105* (2013.01); *G06F 21/44* (2013.01); *H04L 9/0861* (2013.01); *H04L 9/3263* (2013.01); *H04L 63/0823* (2013.01); *H04L 63/20* (2013.01); *H04L 9/006* (2013.01)

(58) Field of Classification Search
CPC ........ G06F 21/105; G06F 21/51; G06F 21/64; G06F 21/44; H04L 9/3263; H04L 9/0861; H04L 9/006; H04L 63/0823; H04L 63/20
See application file for complete search history.

(56) References Cited

U.S. PATENT DOCUMENTS

| | | | | |
|---|---|---|---|---|
| 10,298,577 | B1* | 5/2019 | Aithal | G06F 9/45558 |
| 10,397,255 | B1* | 8/2019 | Bhalotra | H04L 63/1425 |
| 10,547,456 | B1* | 1/2020 | Liljenstolpe | H04L 9/3263 |
| 2006/0230463 | A1* | 10/2006 | Cawlfield | H04L 9/302 |
| | | | | 726/27 |
| 2010/0138485 | A1* | 6/2010 | Chow | H04L 67/2842 |
| | | | | 709/203 |
| 2013/0061281 | A1 | 3/2013 | Pao et al. | |
| 2014/0109072 | A1* | 4/2014 | Lang | G06F 9/45504 |
| | | | | 717/168 |

(Continued)

OTHER PUBLICATIONS

Waked, Louis, Mohammad Mannan, and Amr Youssef. "To intercept or not to intercept: Analyzing tls interception in network appliances." Proceedings of the 2018 on Asia Conference on Computer and Communications Security. 2018. (pp. 399-412). (Year: 2018).*

(Continued)

*Primary Examiner* — Karl L Schmidt

(74) *Attorney, Agent, or Firm* — Barry Blount

(57) ABSTRACT

In an example computer-implemented method, a trusted root certificate for an application running in a container is dynamically generated. The generated trusted root certificate is injected at runtime. The generated certificate is dynamically added to a list of trusted root certificates. A proxy associated with the application instance is authenticated based on the generated root trust certificate.

19 Claims, 6 Drawing Sheets

(56) References Cited

U.S. PATENT DOCUMENTS

| | | | | |
|---|---|---|---|---|
| 2014/0140213 | A1* | 5/2014 | Raleigh | H04L 65/601 |
| | | | | 370/235 |
| 2014/0173060 | A1* | 6/2014 | Jubran | G06F 9/5072 |
| | | | | 709/220 |
| 2015/0007262 | A1* | 1/2015 | Aissi | G06F 21/60 |
| | | | | 726/2 |
| 2015/0143456 | A1* | 5/2015 | Raleigh | H04W 12/0808 |
| | | | | 726/1 |
| 2015/0379259 | A1* | 12/2015 | Mohammed | G06F 21/44 |
| | | | | 726/6 |
| 2017/0054710 | A1* | 2/2017 | Xiong | H04L 9/3268 |
| 2017/0118196 | A1 | 4/2017 | Ponsini et al. | |
| 2017/0187540 | A1* | 6/2017 | Stopel | G06F 9/45558 |
| 2017/0310487 | A1 | 10/2017 | Lu et al. | |
| 2018/0109538 | A1* | 4/2018 | Kumar | H04L 63/20 |
| 2018/0262344 | A1* | 9/2018 | Broumas | G06F 21/335 |
| 2019/0146816 | A1* | 5/2019 | Reno | G06F 9/455 |
| 2019/0273746 | A1* | 9/2019 | Coffing | H04L 63/105 |
| 2019/0349357 | A1* | 11/2019 | Shukla | H04L 63/0853 |

OTHER PUBLICATIONS

H. Nguyen, R. Ivanov, L. T. X. Phan, O. Sokolsky, J. Weimer and I. Lee, "LogSafe: Secure and Scalable Data Logger for IoT Devices," 2018 IEEE/ACM Third International Conference on Internet-of-Things Design and Implementation (IoTDI), Orlando, FL, 2018, pp. 141-152. (Year: 2018).*

* cited by examiner

DYNAMICALLY GENERATING AND INJECTING TRUSTED ROOT CERTIFICATES

BACKGROUND

The present techniques relate to trusted root certificates. More specifically, the techniques relate to dynamically generating and injecting trusted root certificates.

SUMMARY

According to an embodiment described herein, a system can include processor to dynamically generate a trusted root certificate for an application instance running in a container. The processor can also further inject the generated trusted root certificate at runtime. The processor can also dynamically add the generated certificate to a list of trusted root certificates.

According to another embodiment described herein, a method can include dynamically generating a trusted root certificate for an application instance running in a container. The method can further include injecting the generated trusted root certificate. The method can also further include dynamically adding the generated trusted root certificate to a list of trusted certificates. The method can also include authenticating a proxy associated with the application instance based on the generated root trust certificate.

According to another embodiment described herein, a computer program product can include computer-readable storage medium having program code embodied therewith. The computer readable storage medium is not a transitory signal per se. The program code executable by a processor to cause the processor to dynamically generate a trusted root certificate for an application instance running in a container. The program code can also cause the processor to inject the generated trusted root certificate at runtime. The program code can also cause the processor to dynamically add the generated certificate to a list of trusted root certificates.

DETAILED DESCRIPTION

Figure 1:
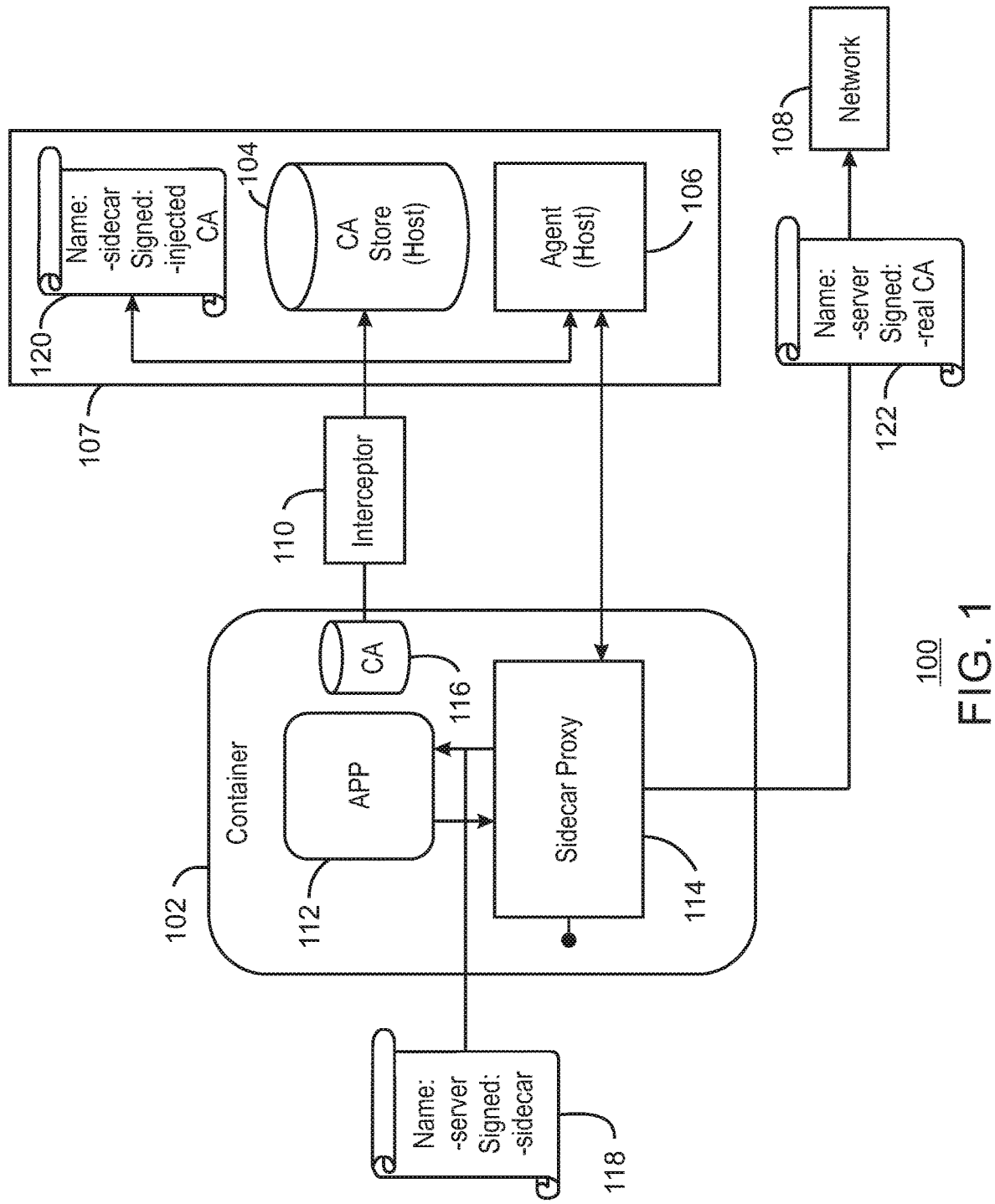
FIG. 1 is a block diagram of an example system for dynamically generating and injecting trusted root certificates.

Transport Layer Security (TLS) may be used to secure end-to-end communications. For example, TLS may be used in web browsing, email, Internet faxing, instant messaging, and voice over IP (VoIP), among other applications. Websites may use TLS to secure all communications between their servers and web browsers. The server may present a certificate containing its public key. If the certificate is validated, the client may use the certificate's public key to negotiate a session encryption key. The session encryption key may only be deciphered using the corresponding private key held by the server. The client may confirm that the server is the intended party and has possession of the private key. Thus, the certificate may serve as proof of identity of the server. Moreover, the certificate's authenticity may also be confirmed by having a trusted Certificate Authority (CA) sign the certificate. A list of CAs may be stored on, and consulted by, the client. For example, the list of CAs may be included in an index file. In cases where mutual authentication is performed, the client may also present a certificate containing its own public key and a similar process may be performed to authenticate the client.

In enterprise settings, among other environments, network middleware may be provided access to a session's clear text in order to provide functionality. For example, network middleware may include load-balancers to perform load balancing decisions, Internet Provider Security (IPS) devices and intrusion detection system (IDS) security devices to perform blocking of attacks, and network optimization devices that may perform optimizing of network traffic. In order to provide these services, network middleware devices may function as man in the middle (MITM). However, MITM is also a type of network attack prevented by the use of TLS. Thus, the functionality of network middleware devices may be negatively impacted by the use of TLS. Moreover, a-priori configuration of clients with an additional trusted CA belonging to the enterprise may add management overhead associated with adding CA to all clients. In addition, forcing clear text communication between clients and middleware boxes or providing middle boxes the private keys of servers to enable network middleware services may introduce security risks.

According to techniques described herein, trusted root certificates can be dynamically generated and injected. An example system includes a processor to dynamically generate a trusted root certificate for a process. For example, the process may be an application instance running in a container. The processor may also dynamically add the generated certificate to a list of trusted certificates. The processor may also inject the generated trusted root certificate. Thus, the techniques described herein allow a CA to be dynamically added to a workload without changing the workload itself. The CA's private and public key may be created at runtime and thus do not involve modification to application images.

In some scenarios, the techniques described herein may be implemented in a cloud computing environment. As discussed in more detail below in reference to at least FIGS. 3-5, a computing device configured to dynamically generate and inject trusted root certificates may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, a block diagram shows an example system for dynamically generating and injecting trusted root certificates. The example system is generally referred to by the reference number 100. The system 100 includes container 102. As used herein, a container refers to a group of one or more processes, running in a containerized environment, with a shared storage and network and a specification for how to run the one or more processes. In some examples, the container may be one or more containers. Containers 102 may share an Internet protocol (IP) address and port space, and may find each other via the pseudonym "localhost". Each container may be assigned a separate IP address to enable application instances to use ports without conflicts. In some examples, containers may be organized into pods to explicitly share a network address and a port number space. For example, containers in a pod may share an IP address and one or more ports. A container 102 may be used to define a volume, such as a local disk directory or a network disk, and expose the volume to one or more containers 102. Application instances within a container 102 may have access to shared volumes that may be defined as part of the container 102 and made available to be mounted into each application's filesystem. The container 102 may be managed manually via an orchestrator or via a controller (not shown), such as an admission controller. The container 102 of FIG. 1 is logically associated with a certificate authority (CA) store 104 and an agent 106. For example, the CA store 104 and the agent 106 may be located on a host machine (107). The CA stored may be access using local APIs via function calls. The container 102 is further communicatively coupled to a network 108. For example, the network 108 may be outside of an enterprise network. The system 100 further includes an interceptor 110 that is communicatively coupled to and between the container 102, and the CA store 104 and the agent 106. The interceptor 110 may be a logical component that can intercept calls made by the application to get information about a trusted root CAs. For example, the interceptor 110 may be a file system driver that intercepts file system calls to obtain information about the trusted root CAs. The container 102 includes an application instance (APP) 112 that is communicatively coupled to a sidecar proxy 114. The container 102 also further includes a certificate authority (CA) 116.

In the example of FIG. 1, using the terminology described above, the container 102 may provide one or more services to one or more clients on a network 108. For example, an application instance 112 may provide a particular service to the one or more clients. The sidecar proxy 114 may be part of a service mesh used to simplify communication handling and improve communication resiliency and security. A service mesh may include components that communicate indirectly using sidecar proxies to complete prerequisites without impacting code of the application instance 112. An example prerequisite may be a transport layer security (TLS) handshake. In order for the sidecar proxy 114 to perform its functions on traffic flowing through the sidecar proxy 114, the traffic from the application instance 112 may be in clear text form. However, it may not be possible to configure traffic from the application instance 112 sent in a clear text form rather than an encrypted form. For example, the application instance 112 may use an imported library that uses traffic encrypted using TLS in communications. In some examples, configuring traffic from the application instance 112 in a clear text form may not be allowed or desirable. Some highly regulated environments may only use encrypted data in application traffic, including localhost traffic. For example, an application may use TLS due to environmental constraints, regulations, or libraries not exposing configuration knobs. Thus, the sidecar proxy 114 may perform a TLS handshake with the application instance 112. However, when a workload associated with the container 102 is deployed, it may not be possible to generate the certificate to be used by the sidecar proxy 114 to establish a TLS connection with the application instance 112. For example, some information used to establish the TLS connection may not be determined at the time of deployment of the container 112. For example, such information may include the particular application instances and sidecar proxies to be running in the network 108, and where the particular application instances and sidecar proxies may be running. Therefore, a root CA may not be able to be added to the application instance. For example, the code or image may not be accessible or modifiable. Thus, the local CA store 116 of container 102 may not include one or more certificates that the sidecar proxy 114 may use for performing TLS with the application instance 112. For example, the application instance 112 may be configured with a set of CAs that the application instance 112 trusts. These trusted CAs may be either added explicitly into an image at build time or inherited from a base container image. The local CA store 116 that is used by the application instance 112 may not include a certificate authority for trusting the proxy generated certificates. The format of the local CA store 116 may be a directory with certs, an index file, etc. In some settings, the application instance 112 may have several locations where root CA certificates are stored.

Still referring to FIG. 1, the sidecar proxy 114 may also generate a unique key pair and make its public key available in any suitable format. The sidecar proxy 114 associated with an application instance 112 may then generate a certificate for itself to use to impersonate remote servers on the network 108. For example, the generated certificate may be sent to the agent 106. The agent 106 may then provide the generated certificate 120 for the sidecar proxy 114 as described below. When a new application container is started, the generated certificate may be injected into all predefined certificate locations in the container by any of the mechanisms described below. If needed, file system accesses are also intercepted at a lower layer and the new certificate is appended to the trust list files. For example, the generated certificate may be injected using a virtualized storage driver or provider, file system drivers, or kernel-based injectors, as described below. For example, the virtualized storage driver or provider may be a graph driver that may be a plugin or driver that may be used to inject modified files on top of an image layer.

During operation, the sidecar proxy 114 may send a certificate 118 to the application instance 112 to initiate a TLS handshake. For example, the certificate 118 may have the name of a server that the sidecar proxy 114 is impersonating and may be signed by the sidecar proxy. The application instance 112 may have one or more locations where it expects to locate certificates. For example, the file system location of trusted CAs may be "/etc/ssl/certificates". In some examples, the file system location or directory may contain one or more files with public keys of trusted CAs. The application instance 112 may also have an associated index file that includes the values of each of the trusted certificates. In some examples, containers may run only one process or application instance. Thus, the index may be used by that application instance. However, the index may be generated using a well-defined format and location and that will be used by any process running inside that container. For example, the index may be part of an image used to deploy an application instance, and thus may be used by any process associated with the image, including the application instance.

The application instance 112 may perform authentication of the sidecar CA in the certificate 118 by first checking its local CA store 116.

An interceptor 110 may intercept the request for the certificate and provide the generated certificate 120 from the agent 106. For example, the generated certificate 120 may include a name of the sidecar proxy 114 and be signed by an injected certificate authority. For example, the injected certificate authority may be a trusted root certificate authority. Thus, the application instance 112 may verify that the sidecar proxy 114 is a trusted CA and establish a TLS connection with the sidecar proxy 114 upon finishing the TLS handshake.

The sidecar proxy 114 may then establish TLS connections with one or more clients on the network 108 using another certificate 122. For example, application instance to sidecar proxy communication may use an injected certificate entry and proxy to service communications may use an original service certificate entry. The certificate 122 may include a server name associated with the container 102 and signed by a real CA. The certificate 122 may be associated with one or more services that appear in a Common Name (CN) or Subject Alternate Names (SAN) fields. In some examples, the client may expect to connect to some service and, as long as the received certificate matches the name the client used and one or more other conditions are met, the received certificate is accepted. For example, the conditions may include an expiry, a signing CA, among other conditions. The service may be a specific container or a service aggregating many containers.

For example, the real CA may be the CA 116. The application instance 112 may have access to and directly or indirectly trust the CA 116. In some examples, the authenticity of server certificates can be validated by having access to a public key of CA 116 only. This trust may be added dynamically and without application code changes using the techniques described herein. The clients may be one or more sidecar proxies 114 associated with one or more application instances in other containers.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional containers, application instances, proxies, agents, certificate authorities, stores, certificates, etc.).

Figure 2:
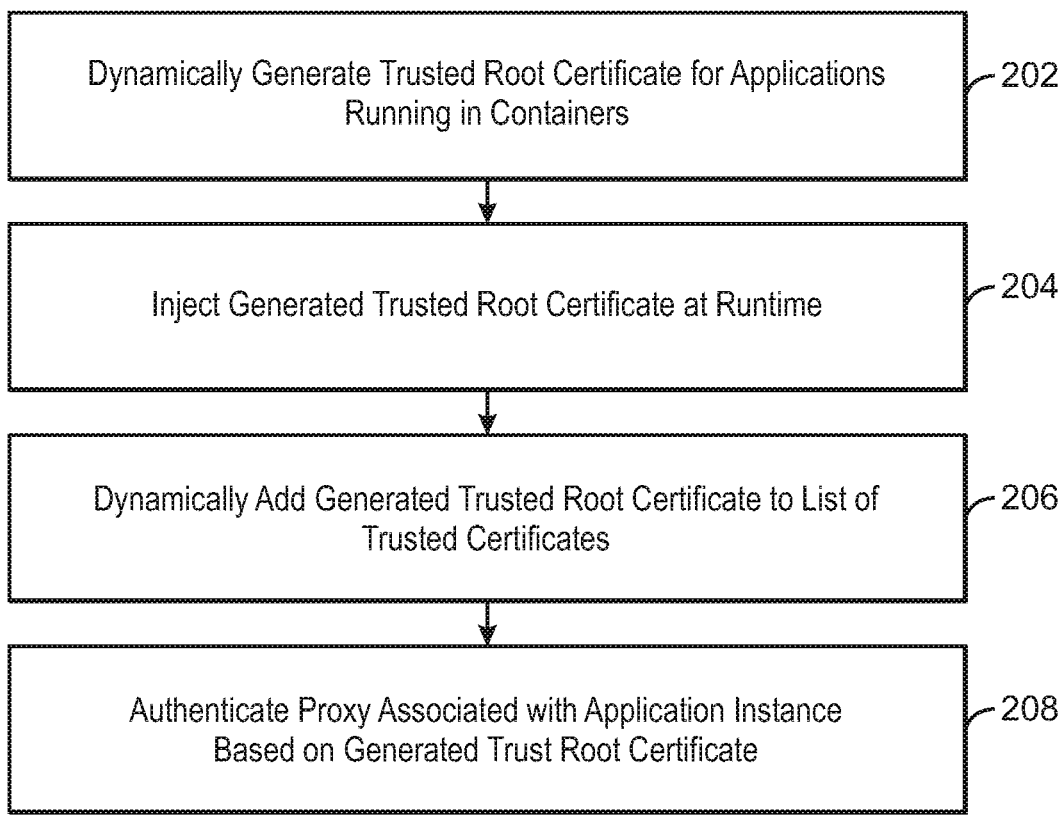
FIG. 2 is a block diagram of an example method that can dynamically generate and inject trusted root certificates.

FIG. 2 is a process flow diagram of an example method that can dynamically generate and inject trusted root certificates. The method 200 can be implemented with any suitable computing device, such as the computing device 300 of FIG. 3 and is described with reference to the systems 100 and 200 of FIGS. 1 and 2. For example, the methods described below can be implemented by the system 100 of FIG. 1 above, the computing device 300 of FIG. 3 below, or using the processor 602 associated with computer readable media 600 of FIG. 6 below.

At block 202, a trusted root certificate for an application instance running in a container is dynamically generated. For example, the trusted root certificate may be generated in response to detecting a new workload.

At block 204, the generated trusted root certificate is injected at runtime. In some examples, a file system call may be intercepted and the generated trusted root certificate may be injected into a directory including trusted certificates. For example, the generated trusted root certificate may be injected into the directory using an overlay file system. As used herein, an overlay file system is a file system including multiple layers in which upper layers may add files onto or mask files of lower layers. The overlay file system may include files from two or more locations, in which files can be added at one location without modifying files in another location. Different sets of files may thus be retrieved depending on which layer of the overlay file system is accessed. The generated trusted root certificate may thus be added at one location such that a workload may find the generated trusted root certificate in a directory of trusted certificates. In some examples, the generated trusted root certificate may be mapped into a directory of a file system associated with the container containing a list of trusted certificates. For example, the generated trusted root certificate may be mapped into the directory using an admission controller. The admission controller can add a volume mount point, such as a file, a directory, or whole directory trees, to new containers on the fly. The admission controller may thus add files from a host name space to a container name space. In this way, a generated trusted root certificate may be mounted into the directory of the container that includes trusted certificates. In some examples, a file system including the generated trusted root certificate may be exposed to the container. For example, the file system may be exposed to the container using a modified graph driver. The graph driver may a plugin or driver that may be used to inject modified files on top of the right image layer. For example, by running a modified graph driver, a container may have access to a different namespace of a host. In some examples, a name of the generated trusted root certificate may be dynamically provided and requested bytes of the generated trusted root certificate may also be dynamically provided in response to detecting a request for the name of the generated trusted root certificate and the requested bytes of the generated trusted root certificate, respectively. For example, the name and bytes of the trusted root certificate may be dynamically provided via a file system driver that may provide a callback for each file system operation of a container. In some examples, a system call including a request for a root certificate may be intercepted via a kernel injector. The kernel injector may then inject the generated trusted root certificate in response to detecting the request.

At block 206, the generated trusted root certificate is dynamically added to a list of trusted certificates. For example, the list may be an index file. In some examples, additional bytes corresponding to the generated trusted root certificate may be virtually appended to the index file in response to detecting a request for the index file. For example, the additional bytes may be virtually appended to the index file using a file system driver that may provide a callback for data for each system operation of a container. For example, the data may include file statistics, such as size, date of modification, name, etc., as well as the file's bytes. The bytes of a file, as used herein, refers to content of a file as opposed to metadata of the file. Using the file system driver, when files of interest are accessed, such as index files, additional bytes may be appended to the access index files. For example, when an application instance 112 reads the index file, the application instance 112 may receive a file size that is larger than the original index file. When the application instance 112 attempts to read beyond the contents of the original index file, the appended bytes corresponding to the generated certificate may be returned via the file system driver as they are requested by the application instance 112. The file system driver may operate at the virtual file system (VFS) layer. In some examples, a kernel-based injector may dynamically add the generated certificate to the list via system call hooking. For example, the kernel injector may monitor file system accesses by a container and change values from the system calls. For example, a system call including a request for an index file may be intercepted via the kernel injector. The kernel injector may then inject the generated trusted root certificate in the requested index file in response to detecting the request. In some examples, the kernel injector may be implemented using extended Berkeley packet filter (EBPF), a language used to create kernel extensions to attach code to system calls that a container makes. Thus, particular systems calls may be hooked at the system call layer, rather than the file system layer, using the kernel injector.

At block 208, a proxy associated with the application instance is authenticated based on the generated root trust certificate. For example, the proxy may be a sidecar proxy that provides one or more middleware services to one or more application instances. The generated trust root certificate may be used by the application instance to authenticate the proxy during a TLS handshake. The proxy may then receive data from the application using a TLS connection. Since the data may not be encrypted at the proxy, the proxy may be able to provide one or more middleware services by analyzing content of the traffic flowing through to other endpoints.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
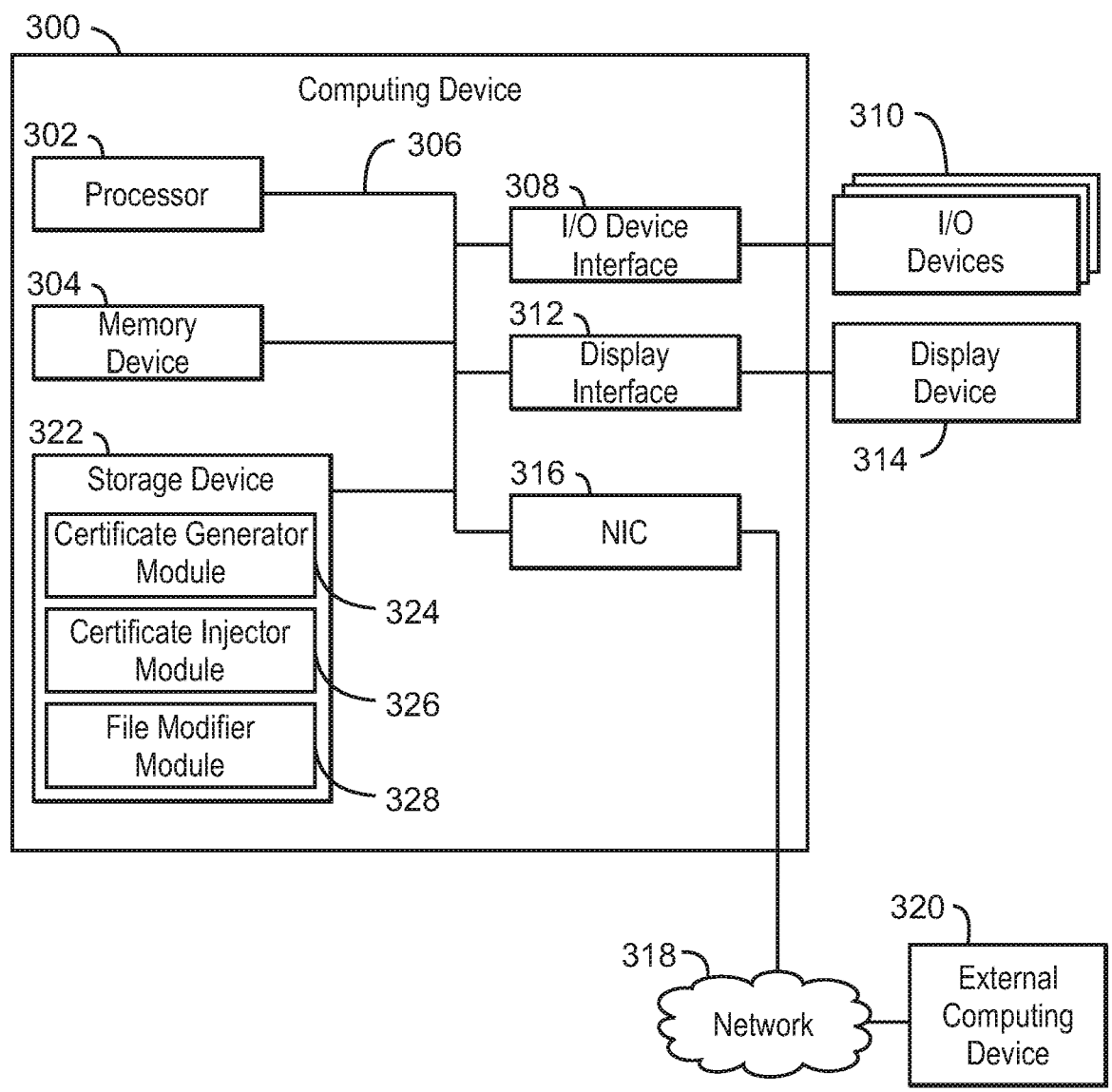
FIG. 3 is a block diagram of an example computing device that can dynamically generate and inject trusted root certificates.

FIG. 3 is block diagram of an example computing device that can dynamically generate and inject trusted root certificates. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 320 may be an external webserver 320. In some examples, external computing device 320 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a certificate generator module 324, a certificate injector module 326, and a file modifier module 328. The certificate generator module 324 can dynamically generate a trusted root certificate for an application instance running in a container. For example, generated trusted root certificate may be used to authenticate a sidecar proxy with an application instance. In some examples, the certificate generator module 324 can intercept a file system call and inject the generated trusted root certificate into a directory including trusted root certificates by combining files including the generated trusted root certificate into one directory using the overlay file system. In some examples, the certificate generator module 324 can map the generated trusted root certificate into a directory of a file system associated with the container containing trusted certificates. In some examples, the certificate generator module 324 can expose a file system comprising the generated trusted root certificate to the container. In some examples, the certificate generator module 324 can dynamically provide a name of the generated trusted root certificate and requested bytes of the generated trusted root certificate. In some examples, the certificate generator module 324 can intercept a system call including a request for a root certificate and inject the generated trusted root certificate. The certificate injector module 326 can inject the generated trusted root certificate at runtime. The file modifier module 328 can dynamically add the generated certificate to a list of trusted root certificates. In some examples, the file modifier module 328 can provide a modified index file including additional appended bytes in response to detecting a request for an index file.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). For example, the computing device may also include an authenticator to authenticate a proxy associated with the application instance based on the generated root trust certificate. Furthermore, any of the functionalities of the certificate generator module 324, the certificate injector module 326, and the file modifier module 328 may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the certificate generator module 324, certificate injector module 326, and file modifier module 328 can be implemented with logic, wherein the logic, as referred to herein, can include any suitable hardware (e.g., a processor, among others), software (e.g., an application, among others), firmware, or any suitable combination of hardware, software, and firmware.

Figure 4:
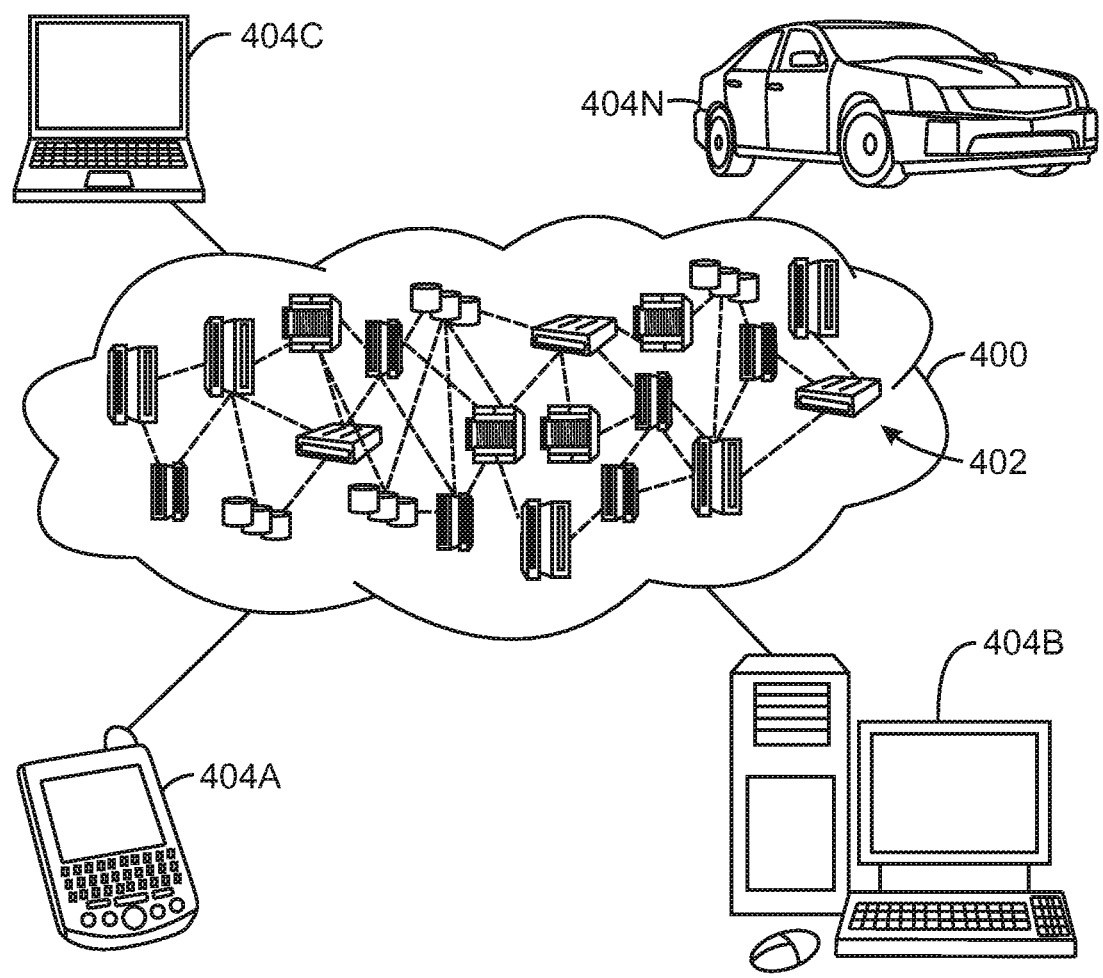
FIG. 4 is a process flow diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
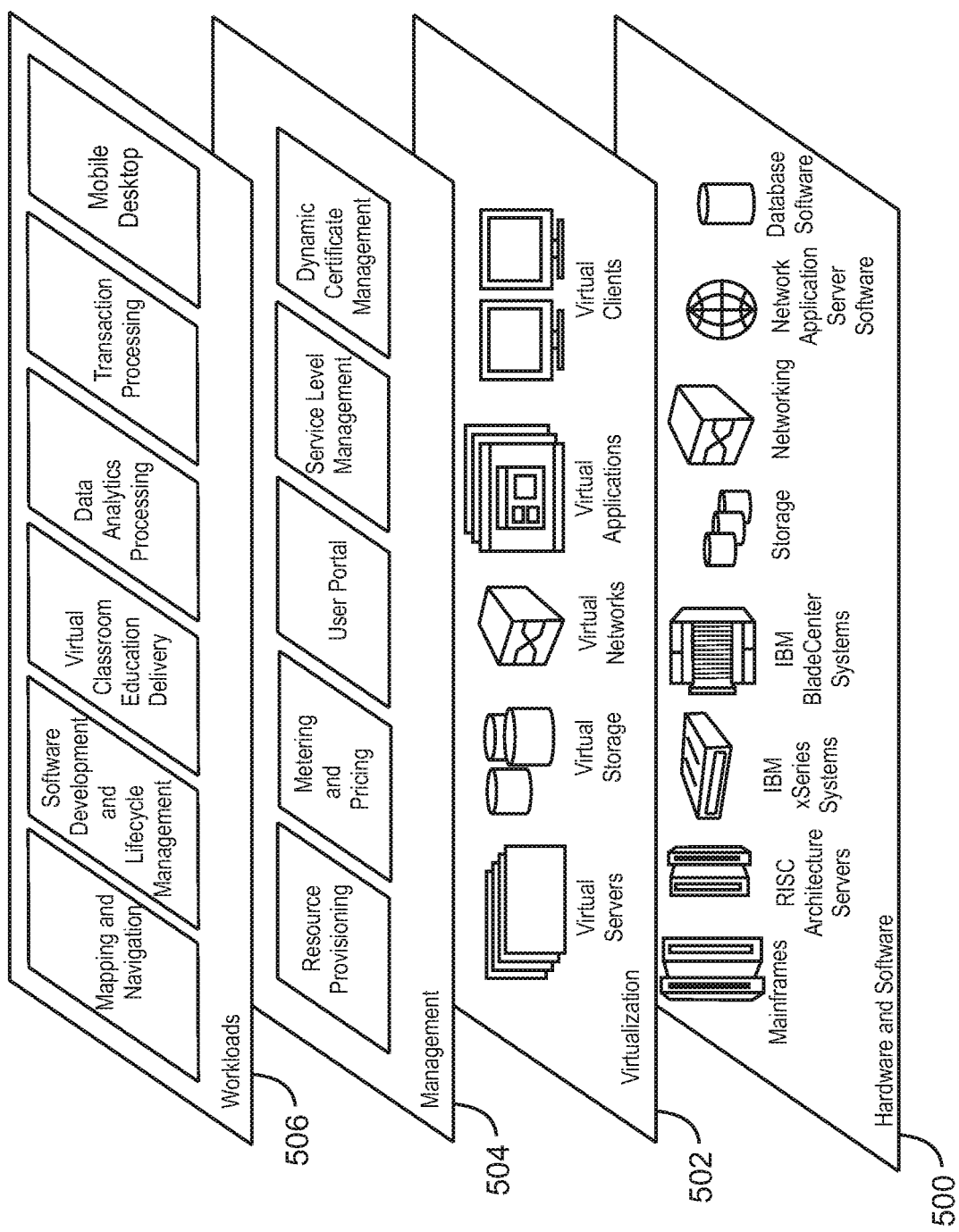
FIG. 5 is a process flow diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Dynamic certificate management provides dynamic certificate generation and injection for authentication within a local network. For example, dynamic certificate management may involve the generation and use of certificates dynamically, to intercept and inspect encrypted traffic. In some examples, dynamic certificate management may be performed within some administrative scope, such as a local network.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
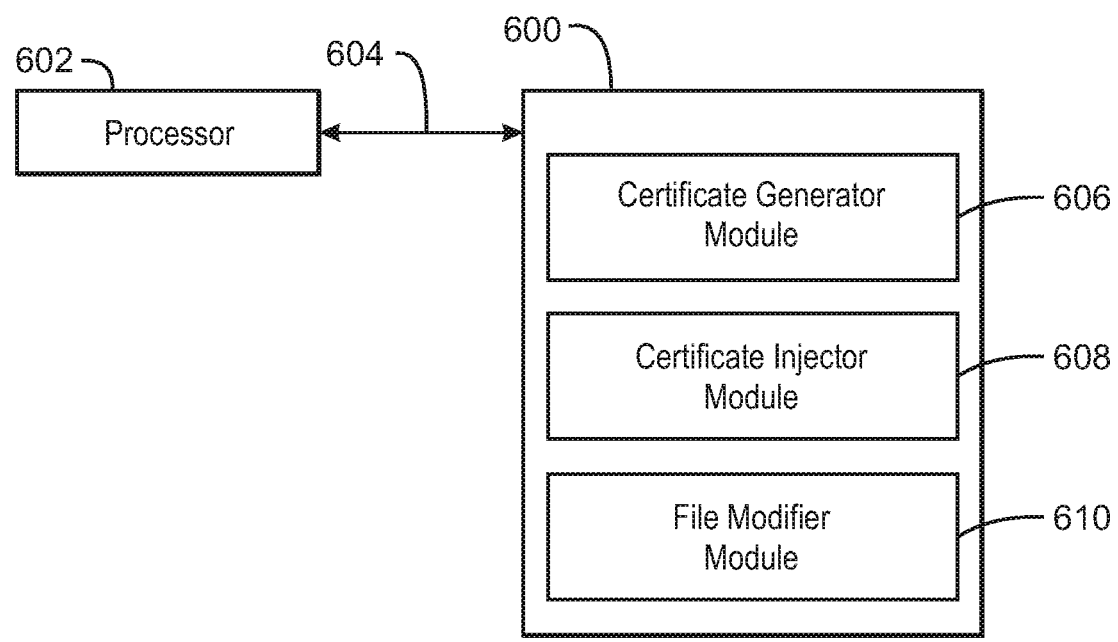
FIG. 6 is an example tangible, non-transitory computer-readable medium that can dynamically generate and inject trusted root certificates.

Referring now to FIG. 6, a block diagram is depicted of an example tangible, non-transitory computer-readable medium 600 that can dynamically generate and inject trusted root certificates. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 500 of FIG. 5 above.

The various software components discussed herein may be stored on the tangible, non-transitory, computer-readable medium 600, as indicated in FIG. 6. For example, a certificate generator module 606 includes code to dynamically generate a trusted root certificate for an application instance running in a container. A certificate injector module 608 includes code to inject the generated trusted root certificate at runtime. For example, the certificate injector module 608 may include code to intercept a file system call and inject the generated trusted root certificate into a directory including trusted certificates by combining files including the generated trusted root certificate using the overlay file system. The certificate injector module 608 may include code to map the generated trusted root certificate into a directory of a file system associated with the container containing trusted certificates. In some examples, the certificate injector module 608 may include code to expose a file system including the generated trusted root certificate to the container. In some examples, the certificate injector module 608 may include code to dynamically provide, via a file system driver, a name of the generated trusted root certificate and requested bytes of the generated trusted root certificate. In some examples, the certificate injector module 608 may include code to intercept a system call including a request for a root certificate and inject the generated trusted root certificate. A file modifier module 610 includes code to dynamically add the generated certificate to a list of trusted root certificates. For example, the file modifier module 610 may include code to provide, via the file system driver, a modified index file including additional appended bytes in response to detecting a request for an index file. It is to be understood that any number of additional software components not shown in FIG. 6 may be included within the tangible, non-transitory, computer-readable medium 600, depending on the particular application. For example, an authentication module (not shown) may authenticate a proxy associated with the application instance based on the generated root trust certificate.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a hardware processor to:
dynamically generate a trusted root certificate for an application instance running in a container in response to detecting a new workload;
intercept a request for a trusted certificate from the application instance;
inject, via the hardware processor, the generated trusted root certificate at runtime in response to detecting the request for the trusted certificate from the application instance;
provide the generated certificate to the application instance, wherein the application instance is to authenticate a proxy associated with the application instance based on the dynamically generated root trust certificate; and
dynamically add the generated certificate to an index file of trusted root certificates in response to detecting a request for the index file.

2. The system of claim 1, comprising an overlay file system, wherein the processor is to intercept a file system call and inject the generated trusted root certificate into a directory comprising trusted certificates by combining files comprising the generated trusted root certificate into the directory using the overlay file system.

3. The system of claim 1, comprising an admission controller to map the generated trusted root certificate into a directory of a file system associated with the container comprising root certificates.

4. The system of claim 1, comprising a graph driver to expose a file system comprising the generated trusted root certificate to the container.

5. The system of claim 1, comprising a file system driver to provide a callback for each file system operation of the container, wherein the processor is to dynamically provide a name of the generated trusted root certificate and requested bytes of the generated trusted root certificate, and provide a modified index file comprising additional appended bytes in response to detecting a request for an index file.

6. The system of claim 1, comprising a kernel injector to intercept a system call comprising a first request for a root certificate, a second request to inject the generated trusted root certificate, and a third request to dynamically add the generated certificate to the list of trusted root certificates.

7. The system of claim 1, wherein the generated trusted root certificate is used to authenticate a sidecar proxy with an application instance.

8. A computer-implemented method, comprising:
dynamically generating a trusted root certificate for an application instance running in a container in response to detecting a new workload;
intercepting a request for a trusted certificate from the application instance;
injecting, via a hardware processor, the generated trusted root certificate at runtime in response to detecting the request for the trusted certificate from the application instance;
providing the generated certificate to the application instance, wherein the application instance is to authenticate a proxy associated with the application instance based on the dynamically generated root trust certificate; and
dynamically adding the generated trusted root certificate to an index file of trusted certificates in response to detecting a request for the index file.

9. The computer-implemented method of claim 8, wherein injecting the generated trusted root certificate comprises intercepting a file system call and injecting the generated trusted root certificate into a directory comprising trusted certificates.

10. The computer-implemented method of claim 8, wherein injecting the generated trusted root certificate comprises mapping the generated trusted root certificate into a directory of a file system associated with the container containing trusted certificates.

11. The computer-implemented method of claim 8, wherein injecting the generated trusted root certificate comprises exposing a file system comprising the generated trusted root certificate to the container.

12. The computer-implemented method of claim 8, wherein injecting the generated trusted root certificate comprises dynamically providing a name of the generated trusted root certificate and requested bytes of the generated trusted root certificate in response to detecting a request for the name of the generated trusted root certificate and the requested bytes of the generated trusted root certificate, and wherein dynamically adding the generated trusted root certificate to the list of trusted certificates comprises providing a modified index file comprising an index file with additional bytes corresponding to the generated trusted root certificate appended in response to detecting a request for the index file.

13. The computer-implemented method of claim 8, wherein injecting the generated trusted root certificate comprises intercepting, via a kernel injector, a system call comprising a request for a root certificate, and injecting, via the kernel injector, the generated trusted root certificate.

14. A computer program product, the computer program product comprising a computer-readable storage medium having program code embodied therewith, wherein the computer readable storage medium is not a transitory signal per se, the program code executable by a processor to cause the processor to:
dynamically generate a trusted root certificate for an application instance running in a container in response to detecting a new workload;
intercept a request for a trusted certificate from the application instance;
inject the generated trusted root certificate at runtime in response to detecting the request for the trusted certificate from the application instance;
providing the generated certificate to the application instance, wherein the application instance is to authenticate a proxy associated with the application instance based on the dynamically generated root trust certificate; and
dynamically add the generated certificate to an index file of trusted root certificates in response to detecting a request for the index file.

15. The computer program product of claim 14, further comprising program code executable by the processor to intercept a file system call and inject the generated trusted root certificate into a directory comprising trusted certificates by combining files comprising the generated trusted root certificate into the directory using the overlay file system.

16. The computer program product of claim 14, further comprising program code executable by the processor to map the generated trusted root certificate into a directory of a file system associated with the container containing trusted certificates.

17. The computer program product of claim 14, further comprising program code executable by the processor to expose a file system comprising the generated trusted root certificate to the container.

18. The computer program product of claim 14, further comprising program code executable by the processor to dynamically provide, via a file system driver, a name of the generated trusted root certificate and requested bytes of the generated trusted root certificate, and provide, via the file system driver, a modified index file comprising additional appended bytes in response to detecting a request for an index file.

19. The computer program product of claim 14, further comprising program code executable by the processor to intercept a system call comprising a request for a root certificate and inject the generated trusted root certificate.

* * * * *